US007455228B2

(12) United States Patent
Ponert et al.

(10) Patent No.: US 7,455,228 B2
(45) Date of Patent: Nov. 25, 2008

(54) PASSAGE CONTROL DEVICE

(75) Inventors: Gregor Ponert, Salzburg (AT); Herbert Pamminger, Neukirchen/Altmuenster (AT)

(73) Assignee: Skidata AG, Gartenau (AT)

( * ) Notice: Subject to any disclaimer, the term of this patent is extended or adjusted under 35 U.S.C. 154(b) by 159 days.

(21) Appl. No.: 11/513,843

(22) Filed: Aug. 31, 2006

(65) Prior Publication Data

US 2008/0054069 A1 Mar. 6, 2008

(51) Int. Cl.
*G06K 7/08* (2006.01)

(52) U.S. Cl. .................................... 235/451; 235/382.5

(58) Field of Classification Search ................. 235/451, 235/382, 380, 382.5, 384, 385, 492; 340/5.81, 340/5.2, 573.1, 540, 541, 561
See application file for complete search history.

(56) References Cited

U.S. PATENT DOCUMENTS 3,519,993 A 7/1970 Sakai et al.
3,560,996 A 2/1971 Berl
6,157,952 A * 12/2000 Geiszler et al. ............. 709/224
6,617,960 B1 9/2003 Fischer et al.
7,061,383 B2 * 6/2006 Davis et al. .............. 340/573.1
2002/0067259 A1 * 6/2002 Fufidio et al. ............... 340/541
2005/0078006 A1 * 4/2005 Hutchins et al. ............ 340/561
2005/0199447 A1 * 9/2005 Benoist ........................ 186/36
2005/0240959 A1 * 10/2005 Kuhn et al. .................... 725/25
2006/0145818 A1 * 7/2006 Kusakabe et al. .......... 340/10.4
2006/0220851 A1 * 10/2006 Wisherd .................. 340/568.1
2007/0119927 A1 * 5/2007 Wingo et al. ................ 235/385
2007/0182556 A1 * 8/2007 Rado ........................ 340/572.1
2007/0268145 A1 * 11/2007 Bazakos et al. .......... 340/573.1

FOREIGN PATENT DOCUMENTS

DE 19 49 074 B2 2/1977
GB 1 502 586 A 3/1978

OTHER PUBLICATIONS

EPO Form 1503 03.82 of the European Search Report dated Sep. 28, 2004.

* cited by examiner

*Primary Examiner*—Thien M Le
(74) *Attorney, Agent, or Firm*—Flynn, Thiel, Boutell & Tanis, P.C.

(57) ABSTRACT

A device for controlling passage in two passage directions has a blocking device for the singling of persons and a card reading unit having a slot for inserting a card, both disposed on a frame. The card reading unit, which upon validly reading the card actuates the blocking device for releasing the passage, is slewably mounted on the frame and is slewable with an actuator as to direct the card insertion slot to a person stepping in front of the blocking device from both the one or the other passage direction.

8 Claims, 1 Drawing Sheet

PASSAGE CONTROL DEVICE

FIELD OF THE INVENTION

The invention relates to a device for the passage control in two passage directions according to the preamble of the claim 1.

DESCRIPTION OF THE RELATED ART

From DE-B 19 49 047 a passage control device is known, wherein the blocking device for the singling of persons is formed by a turnstile, which is disposed on a box-shaped frame, which in passage direction on both sides of the turnstile is provided with a card reading unit having a card insertion slot. Since because of the two card reading units most of the components have to be provided twice, i.e. the known bi-directional access involves high costs.

The passage control device according to U.S. Pat. No. 3,519,993 is provided with a ticket slot having a card reading unit at each of the two ends of a conveyor belt. When the ticket is inserted in the one ticket slot, it is read by the neighboring reading device and the conveyor belt is actuated such that said ticket is ejected by the other ticket slot. Two blocking devices are disposed in passage direction one behind the other at a distance and in between two people detectors. When an invalid card is inserted into the ticket slot for a passage direction, on the basis of the order in which the people detectors respond the passage direction is determined and then the in passage direction next blocking device is moved into the blocking position.

From GB-A-1502586 a device according to the preamble of the claim 1 is known. It is meant for underground traffic and similar means of mass transportation, where tickets are read at the entrance as well as at the exit. Since the main flow of passengers reverses direction between the morning and the evening rush hour, it is provided that an assistant switches the card reading unit accordingly.

It is the problem of the invention to improve the known bi-directional passage control device by providing only one reader unit.

This is achieved according to the invention by the passage control device characterized in claim 1. Advantageous embodiments of the invention are specified in the subclaims.

SUMMARY OF THE INVENTION

According to the invention only one card reading unit is provided for the passage in two passage directions. Therefore, the device according to the invention is characterized by a simple structure. As to the card reading unit having a favorable ergonomics in all two passage directions for inserting the card, it is slewably mounted on the frame and slewable with an actuator, namely such that the insertion slot is located opposite the person stepping in front of the blocking device and in a comfortable fashion for inserting the card, independent of the direction in which the person is going through the passage. On validly reading the card by the card reading unit the blocking device is actuated for releasing the passageway.

Preferably, the card reading unit has a display on its front, which informs the person e.g. about the read result (e.g. “Gate Open” or “Invalid Card”). Since the display is slewable together with the card reading unit, the display too is well visible for the person who steps in front of the blocking device in order to go through the passageway.

As to the card insertion slot is located comfortably opposite the person stepping in front of the blocking device for inserting the card, the angle enclosed by the card insertion direction into the insertion slot and the passage direction preferably is 20 degrees to 80 degrees.

The actuator for swiveling the reader unit preferably is an electromotor. But it can also be formed e.g. by a solenoid, a piston/cylinder unit actuatable by a pressure medium, e.g. compressed air, or the like.

The card reading unit can be, for example, a reader unit for cards having a bar code and/or magnetic stripe or a reader unit for contact-type chip cards.

The slewable mounting of the card reading unit can be designed in different fashions. For example, the card reading unit can be mounted to a swivel arm that is slewably linked to the frame. Or, for example, an arc-shaped guiding extending in passage direction from one to the other side of the blocking device can be provided on the frame, the card reading unit being guided in a displaceable fashion thereon. But preferably the card reading unit is rotatably mounted e.g. on a mounting platform on the frame.

The blocking device preferably is formed by a turning blocking device, in particular by a turnstile. The rotation axis of the turnstile preferably is inclined downward in relation to the horizontal line, for example by an angle of 30 degrees to 60 degrees, the angle of the barrier arms of the turnstile in relation to the rotation axis of the turnstile can be for example 30 degrees to 60 degrees.

The swiveling axis of the card reading unit preferably extends vertically from the bottom to the top, optionally it can extend in an oblique fashion. The swiveling axis preferably intersects the rotation axis of the turnstile.

The device according to the invention in particular is meant for checking persons, who for example enter and exit a building or ground at fairs or similar big events, or at leisure facilities, such as museums, public swimming pools, leisure parks or the like. Since both the entering and the exiting persons are detected, it is possible that, for example, the actual number of persons present at the ground or in the building can be determined or the flow of visitors can be analyzed. Moreover, e.g. in leisure facilities, such as public swimming pools, a recording of the time spent in the facility is possible. In the case of big events, such as fairs, a multiple use of one ticket can be prevented.

The device according to the invention operates fully automatic. For this purpose a sensor system is provided, which detects the position of a person approaching the blocking device and activates the actuator such that the reader unit is swiveled in the direction of the approaching person. When a person approaches the blocking device from a direction and another person from the other direction, the card reading unit can be swiveled to the person who according to the sensor system is nearest to the blocking device.

The sensor system can be formed by two optical sensors or light scanners, their detection area extending from the blocking device in the one and the other passage direction. Instead of optoelectronic sensors, for example, other sensors, such as ultrasonic sensors may be used.

Since the software of the card reading unit has to be reconfigured, when said unit is swiveled from its admittance position to the initial position and vice versa, according to the invention the reconfiguration preferably is carried out automatically with the swiveling of the card reading unit. In the case of a turning blocking device with the swiveling of the card reading unit the direction of rotation is reversed. I.e., a turning blocking device having a drive is driven in the direction of rotation that corresponds to the passage direction of the person toward the card reading unit has been swiveled.

Preferably, the electromotor driving the turning blocking device at the same time serves as a drive for swiveling the reader unit.

BRIEF DESCRIPTION OF THE DRAWINGS

In the following the invention is explained in more detail by way of example with reference to the attached Figure.

DETAILED DESCRIPTION

Figure 1:
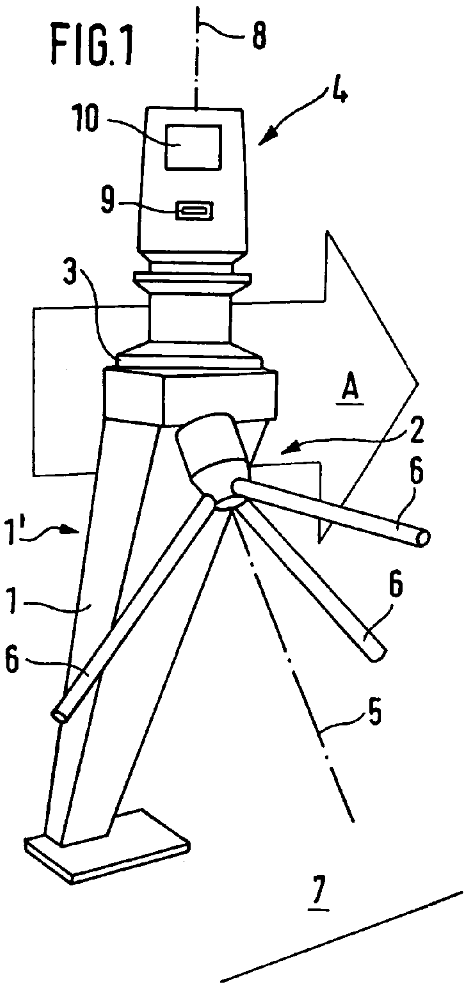
FIGS. 1 and 2 show a perspective view of the passage control device having a card reading unit swiveled in admittance direction or exit direction.
Figure 2:
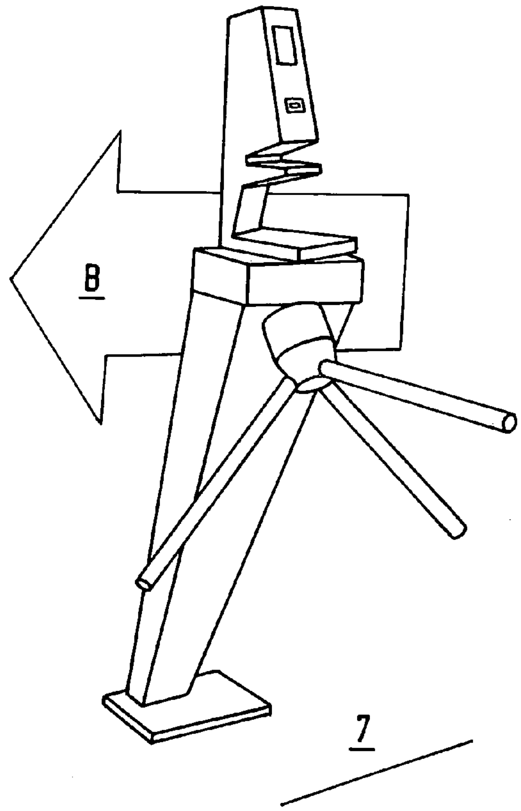

According to FIGS. 1 and 2 the passage control device has frame 1' with housing 1, whereon a turning blocking device is rotatably mounted as blocking device 2. On frame 1' is disposed mounting platform 3, on which card reading unit 4 is slewably mounted.

The rotation axis 5 of the turning blocking device 2 is inclined obliquely downward by an angle of about 45 degrees and provided, for example, with three barrier arms 6, which enclose an angle of about 45 degrees with the rotation axis 5. The barrier arm 6 turned upward respectively protrudes substantially horizontally across the passage 7. Turning blocking device 2 is driven by a (not shown) drive in housing 1, formed by an electromotor having a transmission unit. Card reading device 4, which is slewably mounted to a perpendicular swiveling axis 8 on the frame 1', has a card mouth with insertion slot 9 on its front for inserting an access authorization card, and display 10.

For the admittance check the passageway 7 is passed in passage direction A, and for the exit check in direction B. Therefore, the card reading unit 4 being in the swivel position according to FIG. 1 represents an admittance reader and in the swivel position according to FIG. 2 an exit reader.

Figure 3:
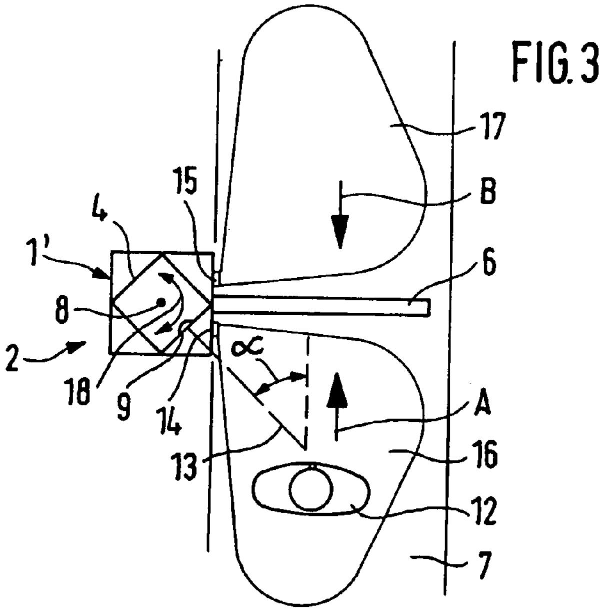
FIG. 3 shows a schematic plan view onto the access control device and a person approaching it.

Card reading unit 4 is swiveled via a not shown transmission unit preferably by the motor that also drives turning blocking device 2. Card reading unit 4 is swiveled such that it is always directed to person 12, who steps in front of turning blocking device 2, independent of whether person 12, as depicted in FIGS. 1 and 3, moves in passage direction A or in passage direction B. With that insertion slot 9 is always located comfortably opposite the person 12, who stands in front of turning blocking device 2 in order to go through the passageway 7, for inserting the card, independent of whether the person approaches turning blocking device 2 in direction A or direction B. Preferably, card insertion slot 9 is located obliquely opposite the person stepping in front of turning blocking device 2 such that card insertion direction 13 into insertion slot 9 and passage direction A, B enclose an angle $\alpha$ of 10 degrees to 80 degrees, in particular 30 degrees to 60 degrees.

Upon validly reading the card the turning blocking device 2 is unblocked in the respective passage direction A, B and/or turning blocking device 2 is turned by its drive such that it can be passed by a person in the respective direction A or B. I.e., turning blocking device 2 in each case is driven in the direction of rotation that corresponds to the passage direction A, B of the person toward the card reading unit 4 is swiveled.

For a fully automatic operation the device according to the invention can be provided with a sensor system, which detects the position of an approaching person 12 and swivels card reading unit 4 in the direction of the approaching person 12.

As depicted in FIG. 3, the sensor system can be formed by two optoelectronic sensors 14, 15, their detection area 16, 17 extending from the barrier arm 6 in the one and the other passage direction A, B.

When person 12 inserts the card in insertion slot 9 according to FIG. 3 and card reading unit 4 reads a valid card, by rotating barrier arm 6 in the direction A turning blocking device 2 is released. After having executed the passage process turning blocking device 2 assumes a waiting position. When a person approaches turning blocking device 2 for example from direction B and steps into the detection area 17 of the sensor 15, card reading unit 4 is swiveled according to the double arrow 18 (FIG. 3) such that then card insertion slot 9 is directed to the person approaching from this direction B. Then the passage process is executed also for this person as described above.

The invention claimed is:

1. A device for controlling passage in two passage directions having a frame (1), on which is disposed a blocking device (2) for the singling of persons and a card reading unit (4) having a slot (9) for inserting a card, wherein upon validly reading the card the card reading unit (4) actuates the blocking device (2) for releasing the passage (7) and the card reading unit (4) is slewably mounted on the frame (1) and is slewable with an actuator as to direct the card insertion slot (9) toward a person (12) stepping in front of the blocking device (2) from both the one and the other passage direction (A, B), characterized by a sensor system, which detects the position of an approaching person (12) and activates the actuator for swiveling the card reading unit (4) in the direction of the approaching person (12).

2. The device according to claim 1, characterized in that the card insertion slot (9) is located obliquely opposite the person (12) stepping in front of the blocking device (2) such that the angle ($\alpha$) enclosed by the card insertion direction (13) into the card insertion slot (9) and the passage direction (A, B) is 20 degrees to 80 degrees.

3. The device according to claim 1, characterized in that the card reading unit (4) is rotatably mounted on a platform (3) of the frame (1').

4. The device according to claim 1, characterized in that the sensor system (2) comprises sensors (14, 15), the detection area (16, 17) of which extends from the blocking device (2) in the one and the other passage direction (A, B).

5. The device according to claim 1, characterized by a reconfiguration of the software of the card reading unit (4) between admittance logic and exit logic when swiveling from the one into the other passage direction (A, B) and vice versa.

6. The device according to claim 1, characterized in that the blocking device (2) for the singling of persons is formed by a turning blocking device that is driven by a drive in the direction of rotation, which corresponds to the passage direction of the person toward the card reading unit (4) is swiveled.

7. The device according to claim 6, characterized in that the drive of the turning blocking device at the same time is the drive for swiveling the card reading unit (4).

8. The device according to claim 1, characterized in that the card reading unit (4) has a display (10).

* * * * *